(12) United States Patent
Imura

(10) Patent No.: US 9,762,147 B2
(45) Date of Patent: Sep. 12, 2017

(54) POWER CONVERSION SYSTEM

(71) Applicant: DENSO CORPORATION, Kariya, Aichi-pref. (JP)

(72) Inventor: Takashi Imura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/116,022

(22) PCT Filed: Feb. 4, 2015

(86) PCT No.: PCT/JP2015/000493
§ 371 (c)(1),
(2) Date: Aug. 2, 2016

(87) PCT Pub. No.: WO2015/125427
PCT Pub. Date: Aug. 27, 2015

(65) Prior Publication Data
US 2017/0110986 A1    Apr. 20, 2017

(30) Foreign Application Priority Data

Feb. 24, 2014  (JP) .................................. 2014-032904

(51) Int. Cl.
| | |
|---|---|
| *H02M 7/493* | (2007.01) |
| *H02M 1/15* | (2006.01) |
| *H02M 7/5387* | (2007.01) |
| *H02M 1/14* | (2006.01) |
| *H02P 6/14* | (2016.01) |
| *H02P 27/08* | (2006.01) |

(52) U.S. Cl.
CPC ........... *H02M 7/5387* (2013.01); *H02M 1/14* (2013.01); *H02P 6/14* (2013.01); *H02P 27/08* (2013.01)

(58) Field of Classification Search
CPC .. H02M 1/14; H02M 1/15; H02M 2001/0085; H02M 7/493; H02M 7/537; H02M 7/5387; H02P 27/08; H02P 6/14
IPC ................................................ H02P 27/08,6/14
See application file for complete search history.

(56) References Cited

U.S. PATENT DOCUMENTS

| | | | | |
|---|---|---|---|---|
| 5,359,278 A | * | 10/1994 | Notohara | ................. G05F 1/613 323/222 |
| 2012/0292985 A1 | | 11/2012 | Sakai | |
| 2013/0242630 A1 | * | 9/2013 | Kurushima | ........... H02M 7/537 363/131 |
| 2014/0321171 A1 | * | 10/2014 | Fujita | ...................... H02M 1/14 363/37 |

(Continued)

FOREIGN PATENT DOCUMENTS

| | | |
|---|---|---|
| JP | 2002-272114 A | 9/2002 |
| JP | 2014-050294 A | 3/2014 |
| JP | 2014-057381 A | 3/2014 |

*Primary Examiner* — Fred E Finch, III
(74) *Attorney, Agent, or Firm* — Posz Law Group, PLC

(57) ABSTRACT

In a power conversion system, when a frequency of a ripple current, flowing into a power supply line of a direct current power source, is equal to a resonance frequency of an LC filter, a resonance is efficiently restricted. In the LC filter connected between the direct current power source and an inverter circuit, an N channel MOSFET is arranged between a capacitor and ground. When a BPF detects an occurrence of the resonance in the LC filter, an inverting amplifier operates the N channel MOSFET and changes a series resistance value of a current path on which the capacitor is arranged.

7 Claims, 8 Drawing Sheets

(56) References Cited

U.S. PATENT DOCUMENTS

| | | | |
|---|---|---|---|
| 2014/0328091 A1 | 11/2014 | Sakakibara et al. | |
| 2015/0155804 A1* | 6/2015 | Sakai | H02P 27/085 318/400.27 |
| 2015/0280601 A1* | 10/2015 | Sakakibara | H02M 1/15 363/37 |
| 2016/0056711 A1* | 2/2016 | Umetani | H02M 1/32 363/56.01 |

* cited by examiner

POWER CONVERSION SYSTEM

CROSS REFERENCE TO RELATED APPLICATIONS

This application is a U.S. national stage application of International Patent Application No. PCT/JP2015/000493 filed on Feb. 4, 2015 and is based on Japanese Patent Application No. 2014-32904 filed on Feb. 24, 2014, the disclosure of which is incorporated herein by reference.

TECHNICAL FIELD

The present disclosure relates to a power conversion system in which power conversion circuits, converting input voltages by operating switching elements, are connected in parallel with one direct current (DC) power source.

BACKGROUND

The patent literature 1 discloses the following in-vehicle electric system. A first electric motor driving device and a second electric motor driving device are connected to a common DC power source. The first electric motor driving device drives a motor for running, and the second electric motor driving device drives a motor for an air conditioning device. A capacitor is connected in parallel with the DC power source. An LC filter is connected to a power source side of the second electric motor driving device. A resistor element is connected in series with a capacitor of the LC filter. When a frequency of a ripple current, outputted from the first electric motor driving device, overlaps with a resonance frequency of a π (pi) filter including C-L-C, the resistor element restricts an occurrence of resonance in the filter.

PATENT LITERATURE

Patent Literature 1: JP 2012-244651 A

SUMMARY

However, in the structure disclosed in the patent literature 1, even when the frequency of the ripple current does not overlap with the resonance frequency of the π filter, the resistor element, which is connected in series with the capacitor, constantly consumes electricity. As a result, electric power consumption is increased.

It is an object of the present disclosure to provide a power conversion system capable of restricting resonance efficiently when a frequency of a ripple current, which flows in a power line of a DC power source, is equal to a resonance frequency of an LC filter.

According to an aspect of the present disclosure, a power conversion system includes: at least one first power conversion circuit that is connected in parallel with one direct current power source and converts an input voltage by operating a switching element; at least one second power conversion circuit that is connected in parallel with the direct current power source, converts another input voltage by operating another switching element and has an electric power consumption of a load smaller than the first power conversion circuit; an LC filter that is connected between the direct current power source and the second conversion circuit; a resonance detection unit that is arranged at an input side of the LC filter and detects an occurrence of a resonance in the LC filter; and a control switching element that is connected in series with a capacitor of the LC filter. The power conversion system further includes a resistance value change unit that changes a series resistance value of a current path, on which the capacitor is arranged, by operating the control switching element when the resonance detection unit detects the occurrence of the resonance.

According to the structure of the power conversion system described above, the control switching element is arranged in the LC filter, connected between the direct current source and the second power conversion circuit, and connected in series with a capacitor of the LC filter. When the resonance detection unit detects the occurrence of the resonance in the LC filter, the resistance value change unit operates the control switching element and changes the series resistance value of the current path, on which the capacitor is arranged.

As such, a switching frequency of the first power conversion circuit, which has larger electric power consumption, is changed. Even when the frequency of the ripple current, flowing into the second power conversion circuit through the power line, approaches to the resonance frequency of the LC filter, the resistance value change unit, which changes the series resistance value of the current path including the capacitor, restricts an excess amount of the current from flowing to the capacitor due to the resonance. Accordingly, the resistor element arranged on the current path does not constantly consume the electricity as described in the patent literature 1, and the occurrence of the resonance is restricted more efficiently.

BRIEF DESCRIPTION OF DRAWINGS

The above and other objects, features and advantages of the present disclosure will become more apparent from the following detailed description made with reference to the accompanying drawings, in which.

DETAILED DESCRIPTION

First Embodiment

Figure 1:
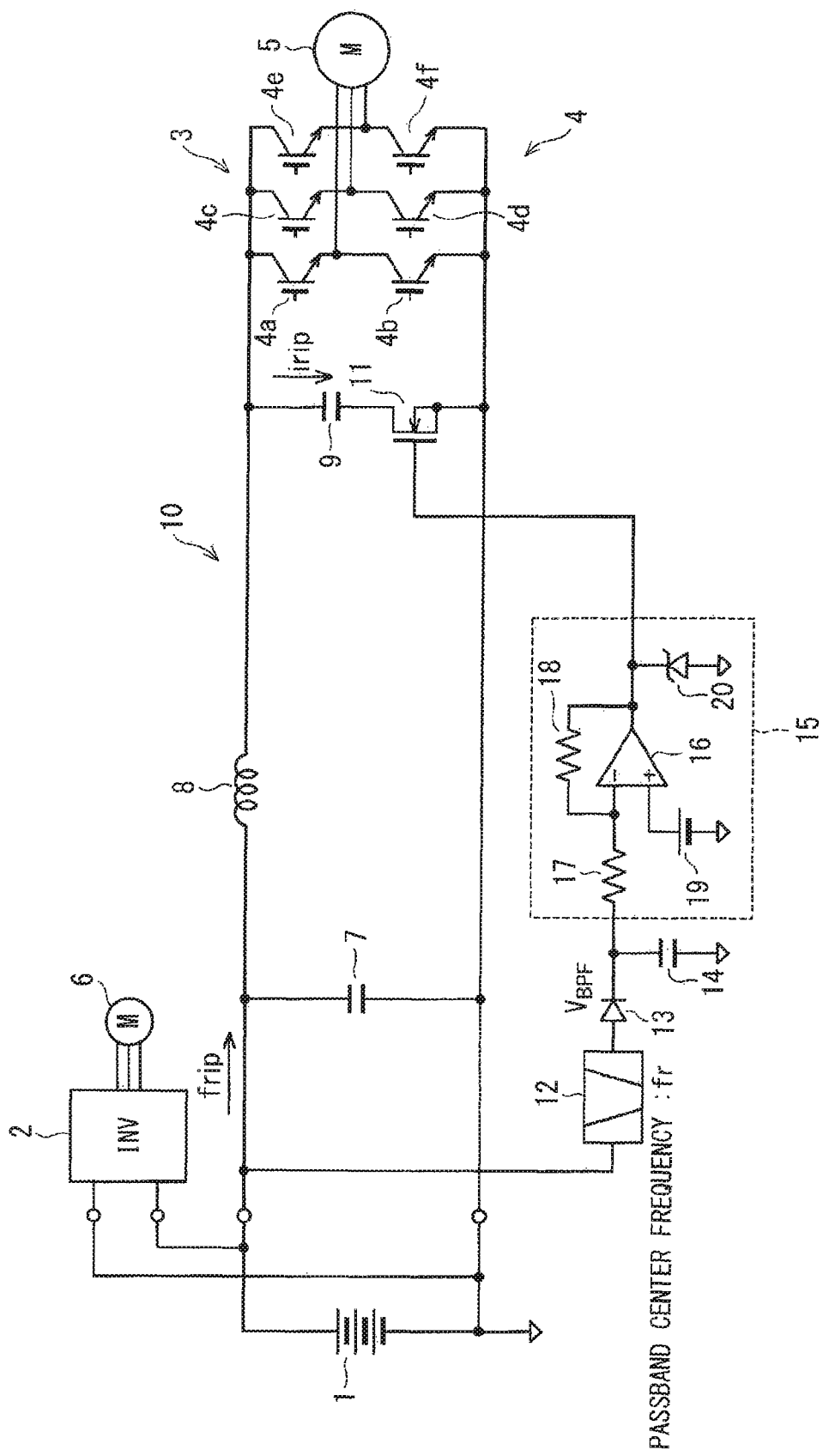
FIG. 1 is a diagram illustrating a structure of a power conversion system according to a first embodiment.

Hereinafter, a first embodiment will be described with reference to FIG. 1 to FIG. 4. Two inverter circuits 2 and 3 are connected in parallel with a direct-current (DC) power source 1. The inverter circuit 3 (corresponding to a second power conversion circuit) has switching elements including, for example, six IGBTs 4 (4a to 4f) that are three-phasebridge connected. Each output terminal of the phases of the inverter circuit 3 is connected to an end of each stator winding (which is not illustrated) of a motor 5. Although not specifically illustrated, the inverter circuit 2 (corresponding to a first power conversion circuit) has a similar structure, and each output terminal of the phases of the inverter circuit 2 is connected to an end of each stator winding of a motor 6 (corresponding to a load).

The motor 6 is, for example, a running transaction motor of an electric vehicle (e.g., a permanent magnet type synchronous motor such as an IPMEM). Although not illustrated, a rotation axis of the motor 6 is connected to drive wheels through a drive axis. The motor 5 (corresponding to a load) is, for example, a drive motor for a radiator fan, which is an in-vehicle accessory (e.g., a permanent magnet type synchronous motor such as an SPMSM). Electric power consumption when the motor 5 is driven by the inverter circuit 3 is smaller than electric power consumption when the motor 6 is driven by the inverter circuit 2.

The DC power source 1 is a secondary battery having a terminal voltage of 100 V or more (for example, 288V), such as a lithium ion battery or a nickel hydrogen battery. Although not illustrated, the inverter circuits 2 and 3 are controlled by independent control circuits and controlled by, for example, the gates of the IGBTs 4 receiving driving signals such as Pulse Width Modulation (PWM) signals.

An LC filter 10, including a smoothing capacitor 7, a coil 8 and a capacitor 9, is connected between the DC power source 1 and the inverter circuit 3. An N channel MOSFET 11 (corresponding to a control switching element, a resistance value change unit) is connected between a negative terminal of the capacitor 9 and the ground, a positive terminal of the capacitor 9 being connected to a common connection point with the coil 8.

A positive terminal of the DC power source 1 is connected to an input terminal of a band pass filter 12 (corresponding to a filter circuit). Hereinafter, the band pass filter 12 will be referred to as the BPF 12. An output terminal of the BPF 12 is connected to the ground through a diode 13 and a capacitor 14. A passband of the BPF 12 is set to have a resonance frequency $f_r$ of the LC filter 10 at a center of the passband. A cathode of the diode 13 is connected to an input terminal of an inverting amplifier 15 (corresponding to a resistance value change unit).

The inverting amplifier 15 includes an operational amplifier 16, resistor elements 17 and 18. One end of the resistor element 17 is connected to the cathode of the diode 13, and the other end of the resistor element 17 is connected to an inverting input terminal of the operational amplifier 16. The inverting input terminal of the operational amplifier 16 is connected to an output terminal of the operational amplifier 16 through the resistor element 18. A non-inverting input terminal of the operational amplifier 16 is connected to a reference voltage 19. The output terminal of the operational amplifier 16 is connected to a gate of the N channel MOSFET 11 and connected to the ground through a zener diode 20.

Next, an operation of the present embodiment will be described. When electricity consumed in the inverter circuits 2 and 3 are compared, the inverter circuit 2 consumes electricity larger than the inverter circuit 3. When the inverter circuit 2 drives the motor 6, ripple current, which generates due to the switching controls of the IGBTs of the inverter circuit 2, flows into the inverter circuit 3. When a frequency $f_{rip}$ of the ripple current is different from a resonance frequency $f_r$ of the LC filter 10, the BPF 12 blocks the current having high frequency.

In such a case, an output voltage of the BPF 12 (i.e., the terminal voltage of the capacitor 14) is equal to 0V. Since the terminal voltage of the capacitor 14 is inverted and amplified by the inverting amplifier 15, the output voltage of the inverting amplifier 15 is equal to a zener voltage of the zener diode 20. As a result, the N channel MOSFET 11 keeps an on-state.

Figure 2:
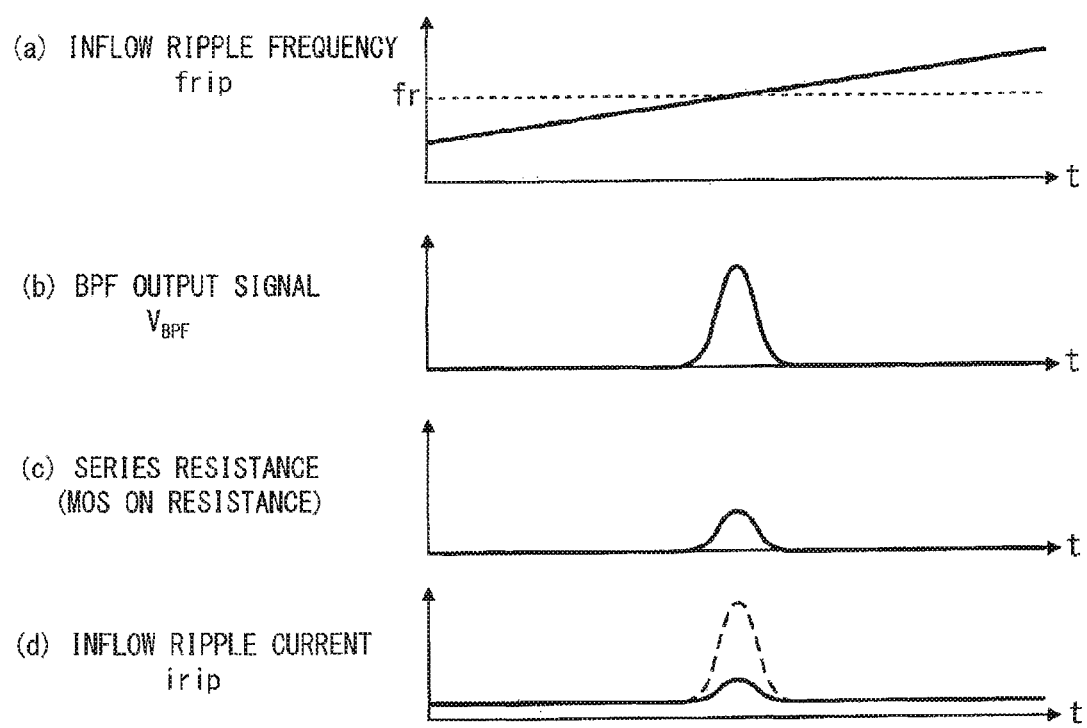
FIG. 2 is a diagram illustrating changes of signals according to a change of a frequency of ripple current.

On the other hand, it is considered a case where the inverter circuit 2 is controlled in a variable-carrier-control manner, and, as shown in (a) of FIG. 2, the frequency $f_{rip}$ of the ripple current increases and exceeds the resonance frequency $f_r$ due to a change of operating condition. In such a case, the BPF 12 raises a level of the output signal within the passband, having the resonance frequency at the center (see, (b) of FIG. 2).

Since the output voltage of the inverting amplifier 15 decreases according to the raising and the gate voltage of the N channel MOSFET 11 decreases, on resistance of the N channel MOSFET 11 increases (i.e., liner control, see (c) of FIG. 2), and the series resistance of the current path including the capacitor 9 increases. As a result, as shown in (d) of FIG. 2, the rising of the ripple current $i_{rip}$ flowing into the capacitor 9 is restricted as shown by a solid line, compared to a case without the N channel MOSFET 11 as shown by a broken line.

Generally, cutoff frequency (corresponding to the resonance frequency $f_r$) of the LC filter 10 is set lower than the frequency of the ripple current, which is supposed to generate regularly. As a result, the LC filter 10 blocks the inflow of the ripple current with the frequency higher than the resonance frequency $f_r$ into the inverter circuit 3.

According to the present embodiment, in the LC filter 10 connected between the DC power source 1 and the inverter circuit 3, the N channel MOSFET 11 is arranged between the capacitor 9 of the LC filter 10 and the ground. When the BPF 12 detects that the resonance occurs in the LC filter 10, the inverting amplifier 15 operates the N channel MOSFET 11 to change the series resistance value of the current path including the capacitor 9.

That is, the switching frequency of the inverter circuit 2, which consumes larger electricity, is changed. When the frequency of the ripple current, flowing into the inverter circuit 3 through the power line, approaches to the resonance frequency of the LC filter 10, the inverting amplifier 15 controls the on resistance of the N channel MOSFET 11 to change the series resistance value of the current path including the capacitor 9. As a result, excessive amount of current caused by the resonance is restricted from flowing into the capacitor 9. Accordingly, the resistor element arranged on the current path does not constantly consume the electricity as described in the patent literature 1, and the occurrence of the resonance is restricted more efficiently.

The inverting amplifier 15 controls the N channel MOSFET 11, in a linear control manner, according to the level of the resonance detected by the BPF 12 and increases the series resistance value. That is, the inverting amplifier 15 continuously changes the on resistance of the N channel MOSFET 11 according to the level of the resonance and increases the series resistance value.

Figure 3:
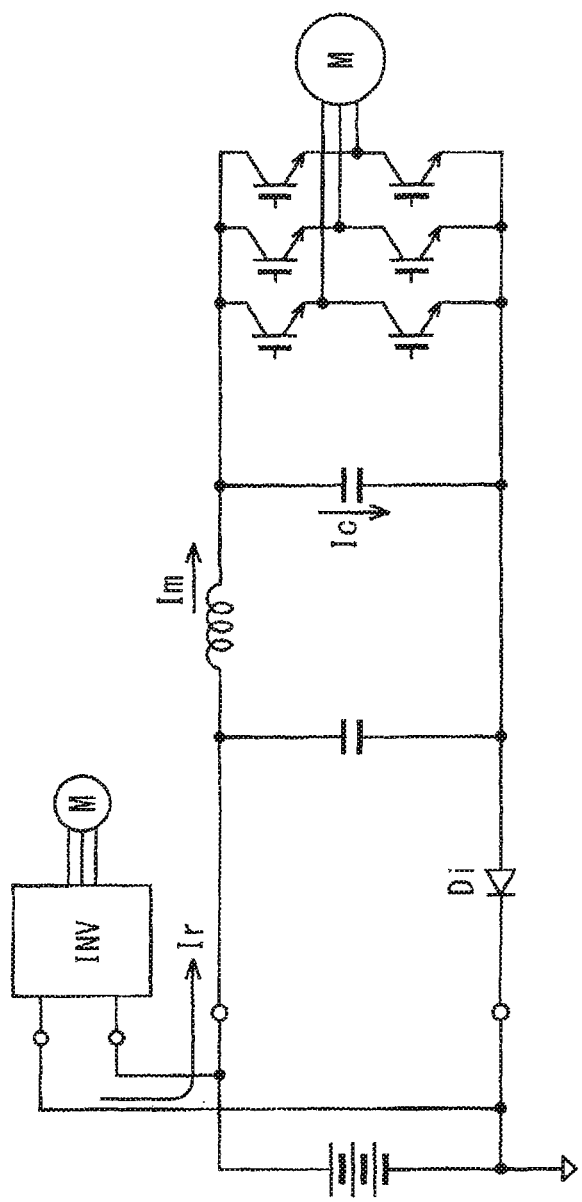
FIG. 3 is a diagram illustrating an example of another structure as a comparative example for the first embodiment.
Figure 4:
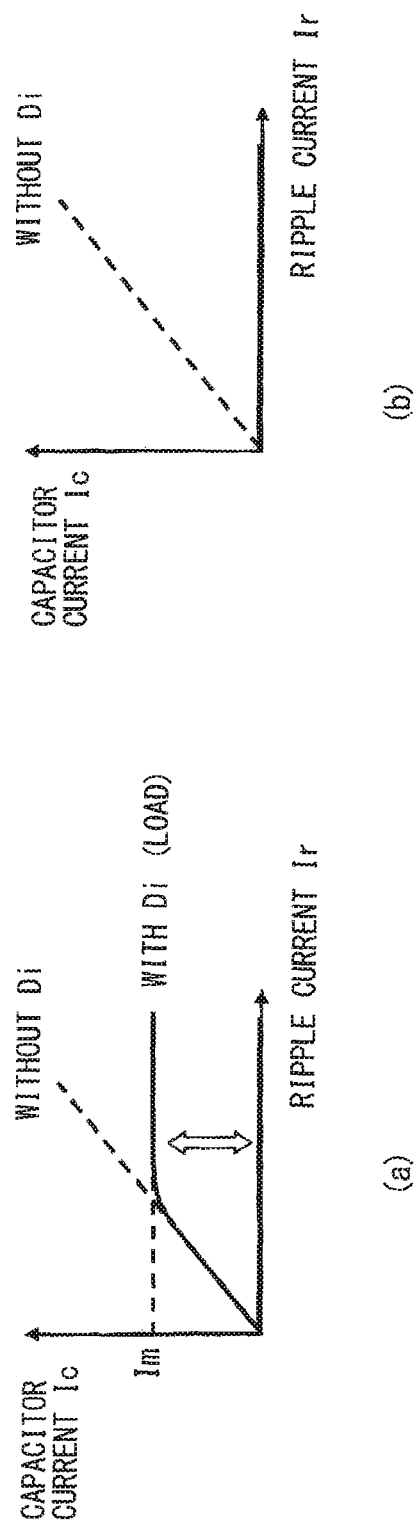
FIG. 4 is a diagram illustrating a relationship of the ripple current Ir and a capacitor current Ic, in which (a) corresponds to the structure of FIG. 3 and (b) corresponds to the structure of the first embodiment.

As shown in a comparative example of FIG. 3, in order to restrict the occurrence of the resonance in the LC filter 10, a diode (Di) may be arranged on a power line of the inverter device connected to the negative side of the power source. In such a case, however, as shown in (a) of FIG. 4, until the ripple current (corresponding to Ir) increases to some extent, the current flowing into the capacitor 9 (corresponding to the capacitor current Ic) increases proportionally, and the capacitor current Ic is defined by the current (corresponding to the inverter current Im) consumed by the load. Therefore, there is a possibility that the reduction effect of the capacitor current Ic decreases as the inverter current Im increases. On the other hand, according to the present embodiment, as shown in (b) of FIG. 4, the capacitor current Ic is reduced regardless of the value of the inverter current Im.

Second Embodiment

Figure 5:
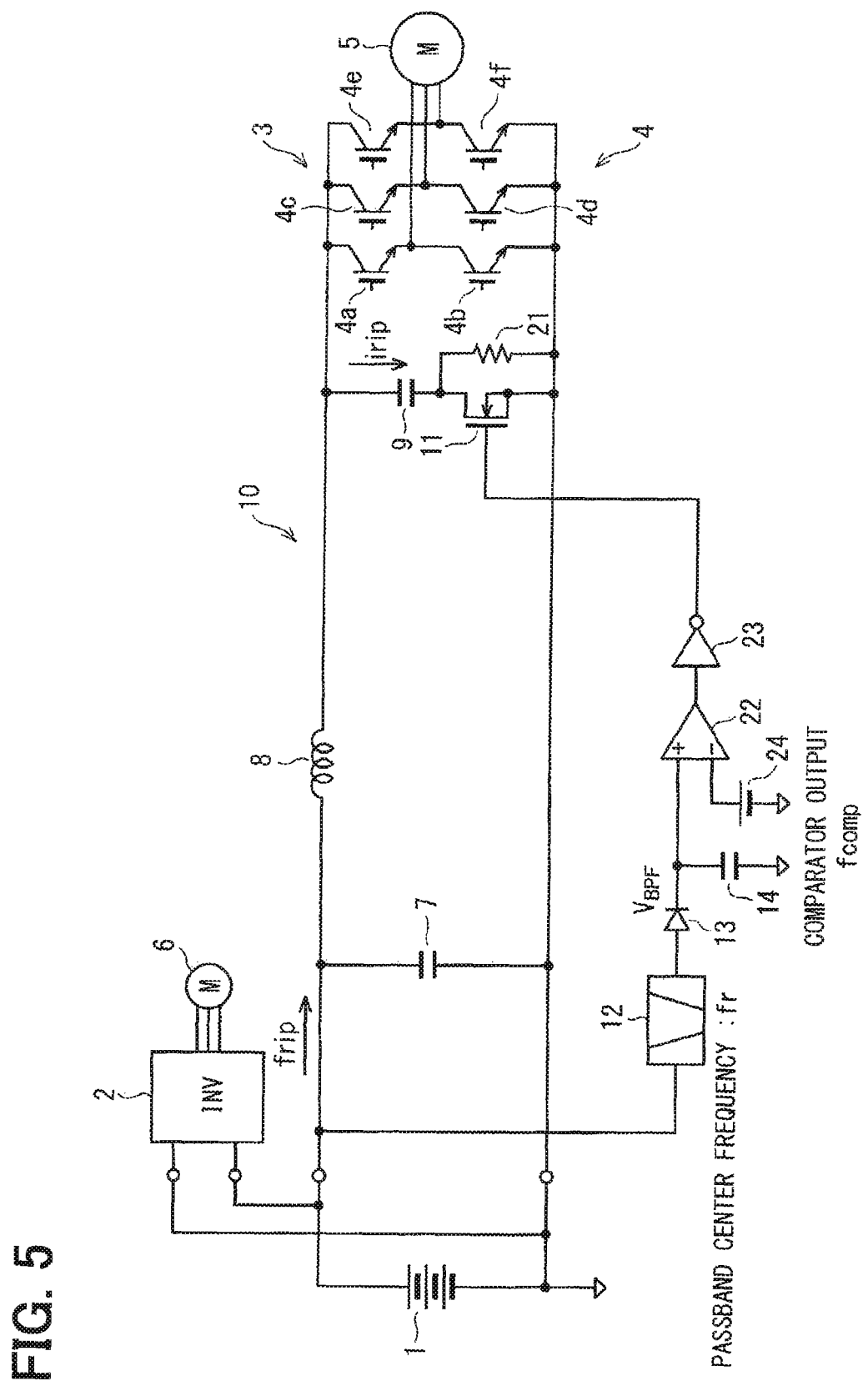
FIG. 5 is a diagram illustrating a power conversion system according to a second embodiment.

Hereinafter, the part similar to the first embodiment will be designed by the same symbol and the description thereof will not be repeated. The part different from the first embodiment will be described. As shown in FIG. 5, in the second embodiment, a resistor element 21 is connected in parallel with the N channel MOSFET 11, and a comparator 22 (corresponding to a resistance value change unit) and NOT gate 23 (corresponding to a resistance changing unit) are arranged instead of the inverting amplifier 15. A cathode of the diode 13 is connected to the non-inverting input terminal of the comparator 22. An inverting input terminal is connected to the reference voltage 24 as a determination threshold. An output terminal of the comparator 22 is connected to the gate of the N channel MOSFET 11 through the NOT gate 23.

Next, an operation of the second embodiment will be described. When the frequency $f_{rip}$ of the ripple current is different from the resonance frequency $f_r$ of the LC filter 10, an output signal $f_{comp}$ of the comparator 22 is low level signal. In this case, the N channel MOSFET 11 keeps the on-state and a current does not flow into the resistor element 21. As such, the LC filter 10 blocks the inflow of the ripple current ($i_{rip}$) with the frequency higher than the resonance frequency $f_r$.

Figure 6:
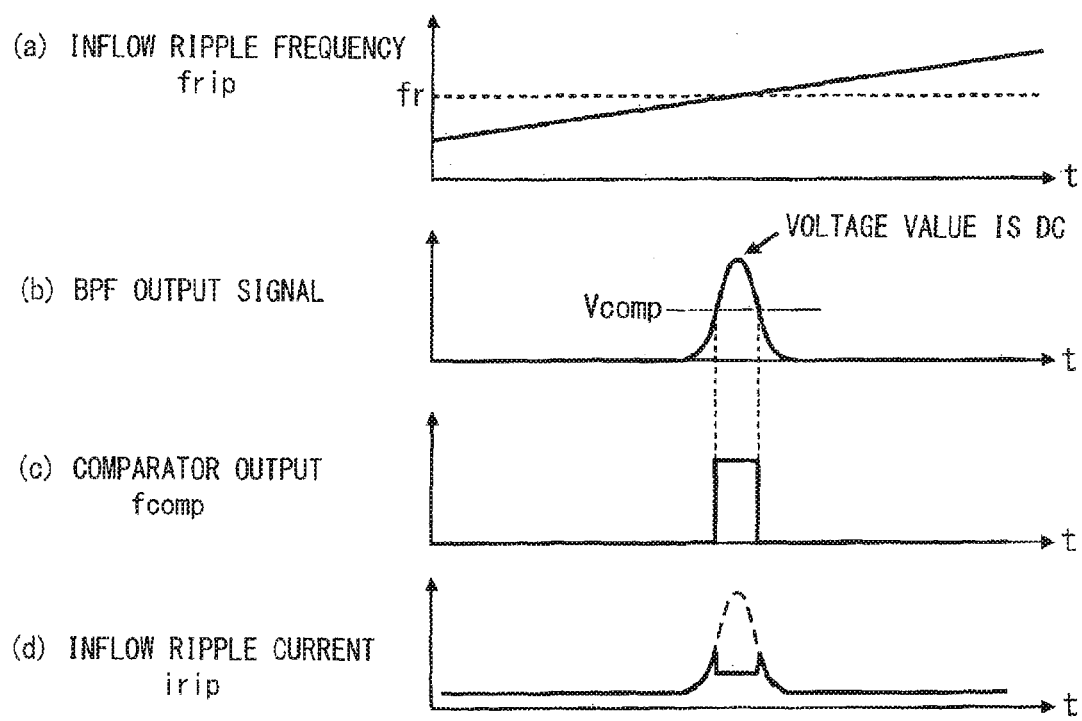
FIG. 6 is a diagram illustrating changes of signals according to a change of a frequency of ripple current in the second embodiment.

As shown in (a) of FIG. 6, when the frequency of the ripple current, which is generated in the inverter circuit 2 similarly to the first embodiment, exceeds the resonance frequency $f_r$, the BPF 12 raises the level of the output signal within the passband (see (b) of FIG. 6). When the output voltage of the BPF 12 increases and exceeds the threshold voltage $V_{comp}$, which is set in the comparator 22, the comparator output signal $f_{comp}$ is changed to high level signal (see (c) of FIG. 6).

In such a case, the N channel MOSFET 11 is turned off, and the current, which flows into the capacitor 9, flows into the resistor element 21, and the series resistance value of the current path including the capacitor 9 increases. As a result, as shown in (d) of FIG. 6, the rising of the ripple current $i_{rip}$ flowing into the capacitor 9 is restricted as shown by the solid line, compared to the rising of the ripple current without the N channel MOSFET 11 as shown by the broken line.

As described above, according to the second embodiment, the resistor element 21, connected in parallel with the N channel MOSFET 11, is provided. When the resonance is not detected, N channel MOSFET 11 is turned on. When level of the resonance detected by the comparator 22 exceeds the threshold level, the N channel MOSFET 11 is turned off. When the resonance occurs in the LC filter 10, the resistor element 21 raises the series resistance value of the current path including the capacitor 9 and restricts the resonance.

Third Embodiment

Figure 7:
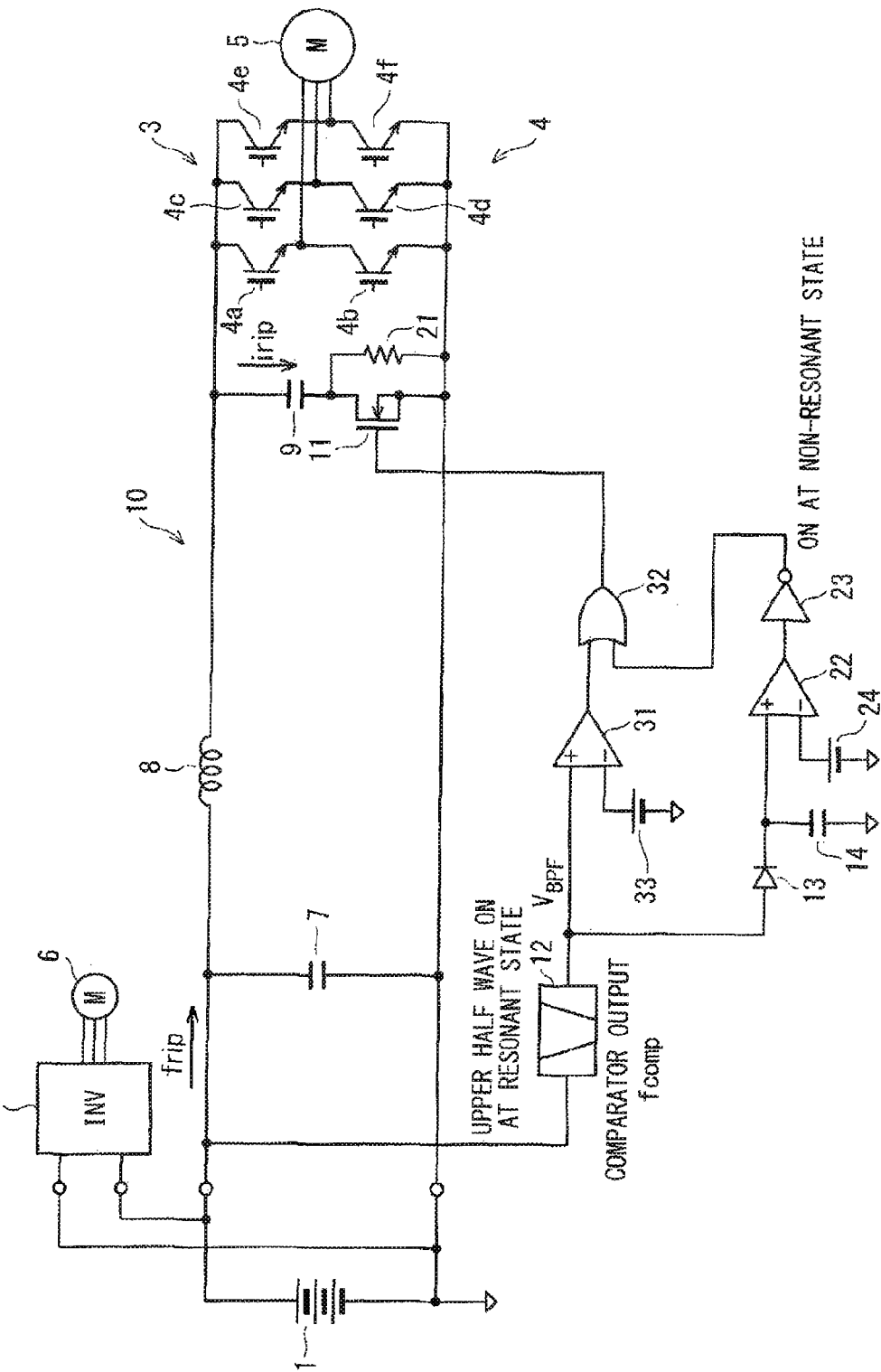
FIG. 7 is a diagram illustrating a power conversion system according to a third embodiment.

As shown in FIG. 7, in a third embodiment, a comparator 31 (corresponding to a resistance value change unit) and an OR gate 32 (corresponding to a resistance value change unit) are added to the structure of the second embodiment. A non-inverting input terminal of the comparator 31 is directly connected to the output terminal of the BPF 12, and an inverting input terminal of the comparator 31 is connected to the reference voltage 33, which is set around 0V. The inverting input terminal of the comparator 31 may be connected to the ground and the reference voltage may be 0V. One terminal of the input terminals of the OR gate 32 is connected to the output terminal of the comparator 31, and the other terminal of the input terminals of the OR gate 32 is connected to the output terminal of the NOT gate 23.

Next, an operation of the third embodiment will be described. When the frequency $f_{rip}$ of the ripple current is different from the resonance frequency $f_r$ of the LC filter 10, similarly to the second embodiment, the gate of the N channel MOSFET 11 receives the output signal (having high level) of the NOT gate 23 through the OR gate 32. As a result, the N channel MOSFET 11 keeps the on-state.

Figure 8:
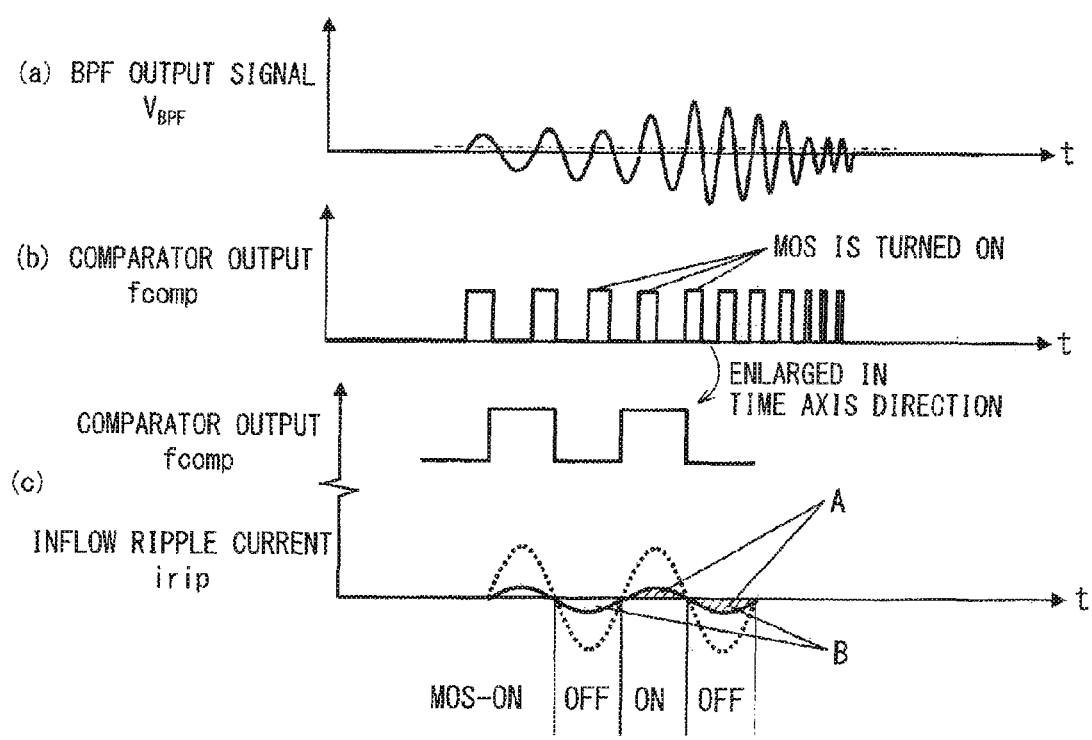
FIG. 8 is a diagram illustrating changes of signals according to a change of a frequency of ripple current in the third embodiment.

When the frequency $f_{rip}$ of the ripple current exceeds the resonance frequency $f_r$, as shown in (a) of FIG. 8, the BPF 12 allows the input signal having the frequency around the resonance frequency to pass through. In FIG. 8, the horizontal axis, which represents time, is illustrated larger than in FIG. 6. As shown in (b) of FIG. 8, the comparator 31 outputs the high level signal to the N channel MOSFET 11 through the OR gate 32 according to the positive half wave of the resonance signal wave outputted from the BPF 12. According to the negative half wave of the resonance signal wave, the comparator 31 outputs low level signal. That is, the N channel MOSFET 11 operates in such a manner that ON/OFF of the N channel MOSFET 11 is switched synchronizedly with the zero-cross timing of the resonance signal wave.

When the NOT gate 23 continuously outputs low level signal while the resonance occurs, the N channel MOSFET 11 is intermittently turned off. While the N channel MOSFET 11 is turned off, the current flows into the resistor element 21, and the series resistance value of the current path including the capacitor 9 is increased compared to the period in which the resonance does not occur.

The wave of the ripple current $i_{rip}$ shown in (c) of FIG. 8 is illustrated such that the time axis is enlarged compared to (a) and (b) of FIG. 8. During the period in which the N channel MOSFET 11 is intermittently turned off, the amplitudes of the wave are the same in the positive side and the negative side and the area (i.e., integrated value) of the waveform when the N channel MOSFET 11 is turned on and the area of the waveform when the N channel MOSFET 11 is turned off are equal (see, hatched portion A in (c) of FIG. 8). While the N channel MOSFET 11 is turned off, the amplitude of the waveform is decreased due to the resistance value, which is increased by the resistor element 21. As such, the amplitude of the waveform while the N channel MOSFET 11 is turned on is also decreased (see portion B in (c) of FIG. 8). The amplitude of the waveform of the ripple current $i_{rip}$ changes to gradually converge to 0V by the switching operation of the N channel MOSFET 11. Accordingly, the occurrence of the resonance is restricted.

As described above, according to the third embodiment, the non-inverting input terminal of the comparator 31 is directly connected to the output terminal of the BPF 12, and the N channel MOSFET 11 is intermittently turned off according to the level of the resonance detected by the BPF 12. As such, the series resistance value of the current path including the capacitor 9 is increased compared to the period while which the resonance does not occur, and the occurrence of the resonance is restricted. Since the N channel MOSFET 11 is switched synchronizedly with the zero-cross timing of the resonance signal wave, switching loss is reduced.

When the wave of the signal outputted from the BPF 12 has a phase lag compared to an actual resonance wave, the phase lag may be adjusted by setting the threshold voltage such that the N channel MOSFET 11 is switched synchronizedly with the zero-cross timing of the actual resonance signal wave.

The present disclosure is not limited to the embodiments described above or described in the drawing, and the following modification or extension may be made in the present disclosure.

The power conversion circuit may be a converter.

The power conversion system may have two first power conversion circuits and two second power conversion circuits.

The resonance detection unit is not limited to the BPF 12 and may be any filter circuit having the passband including the resonance frequency of the LC filter. For example, the resonance detection unit may be a low pass filter.

A bipolar transistor or a MOSFET may be employed as the switching element of the power conversion circuit.

A P channel MOSFET may be employed as the control switching element and may be connected between the coil 8 and the capacitor 9.

A bipolar transistor and an IGBT may be employed as the control switching element.

The load of the power converting circuit is not limited to an in-vehicle device.

Although the present disclosure is described based on the above embodiments, the present disclosure is not limited to the embodiments and the structures. Various changes and modification may be made in the present disclosure. Furthermore, various combination and formation, and other combination and formation including one, more than one or less than one element may be made in the present disclosure.

The invention claimed is:

1. A power conversion system comprising:
    at least one first power conversion circuit that is connected in parallel with one direct current power source and that converts an input voltage by operating a switching element;
    at least one second power conversion circuit that is connected in parallel with the direct current power source, that converts another input voltage by operating another switching element and that has an electric power consumption of a load smaller than the first power conversion circuit;
    an LC filter that is connected between the direct current power source and the second power conversion circuit;
    a resonance detection unit that is arranged at an input side of the LC filter and detects an occurrence of a resonance in the LC filter;
    a control switching element that is connected in series with a capacitor of the LC filter; and
    a resistance value change unit that changes a series resistance value of a current path, on which the capacitor is arranged, by operating the control switching element when the resonance detection unit detects the occurrence of the resonance.

2. The power conversion system according to claim 1, wherein:
    the resonance detection unit includes a filter circuit that has a passband including a resonance frequency of the LC filter.

3. The power conversion system according to claim 2, wherein:
    the filter circuit is a band pass filter.

4. The power conversion system according to claim 1, wherein:
    the resistance value change unit controls the control switching element in a linear control manner according to a level of the resonance detected by the resonance detection unit; and
    the resistance value change unit increases the series resistance value.

5. The power conversion system according to claim 1, wherein:
    the resistance value change unit includes a resistor element connected in parallel with the control switching element;
    the resistance value change unit turns on the control switching element when the resonance detection unit does not detect the resonance; and
    the resistance value change unit turns off the control switching element when the level of the resonance, detected by the resonance detection unit, exceeds a threshold level.

6. The power conversion system according to claim 1, wherein:
    the resistance value change unit includes a resistor element connected in parallel with the control switching element;
    the resistance value change unit turns on the control switching element when the resonance detection unit does not detect the resonance; and
    the resistance value change unit switches the control switching element according to the level of the resonance, detected by the resonance detection unit, and intermittently turns off the control switching element.

7. The power conversion system according to claim 6, wherein:
    the resistance value change unit switches the control switching element synchronizedly with a zero-cross timing of a waveform of the resonance.

* * * * *